T. M. BELKNAP.
ICE CREAM FREEZER.
APPLICATION FILED FEB. 11, 1908.
912,787.
Patented Feb. 16, 1909.
2 SHEETS—SHEET 1.
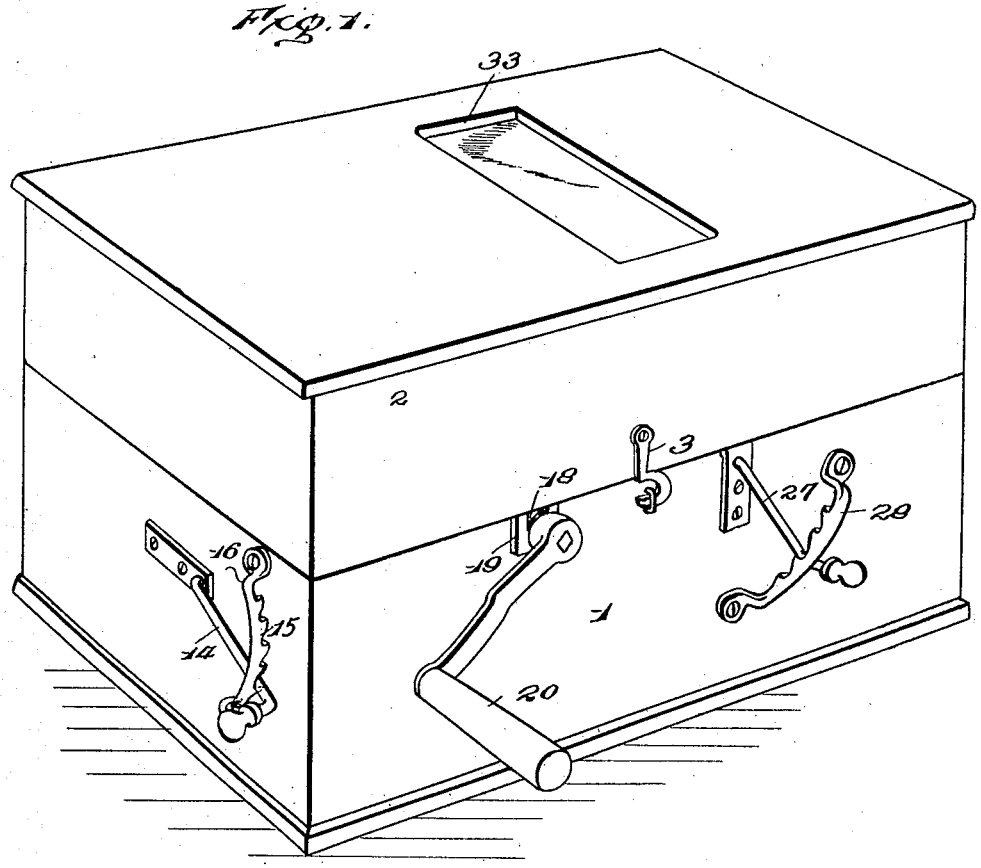
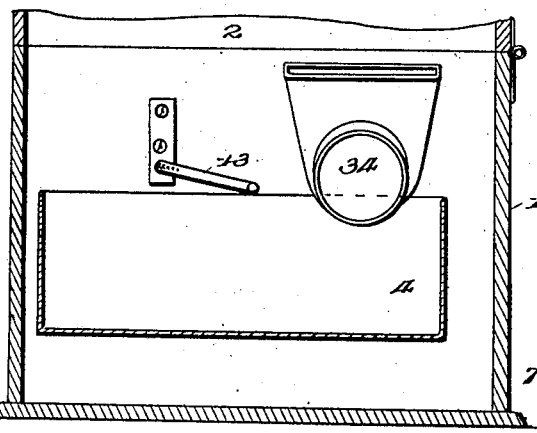
Witnesses
Inventor
Thomas M. Belknap
By
Attorneys
THE NORRIS PETERS CO., WASHINGTON, D. C.

T. M. BELKNAP.
ICE CREAM FREEZER.
APPLICATION FILED FEB. 11, 1908.
912,787.
Patented Feb. 16, 1909.
2 SHEETS—SHEET 2.
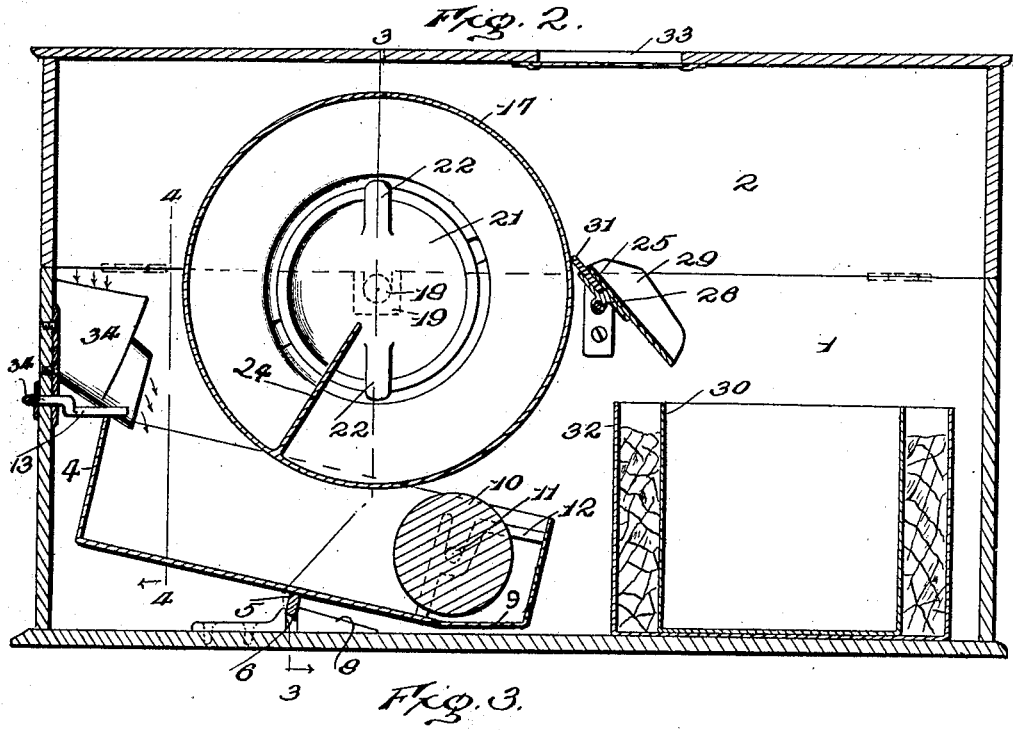
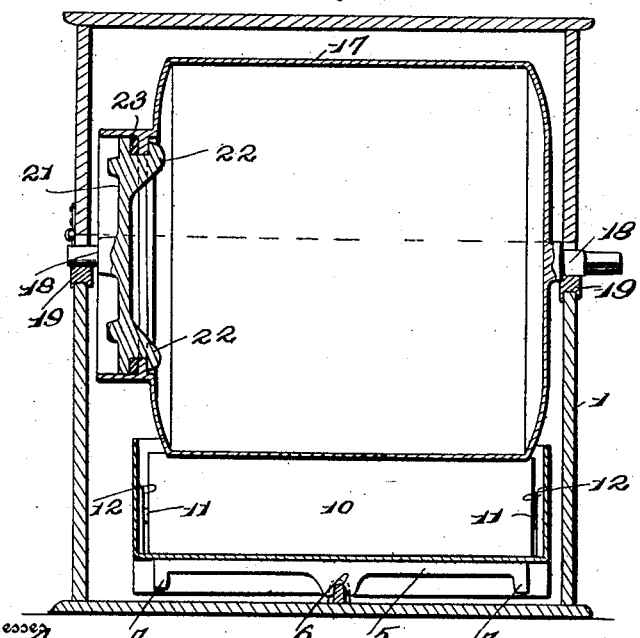

UNITED STATES PATENT OFFICE.

THOMAS M. BELKNAP, OF BURLINGTON, IOWA.

ICE-CREAM FREEZER.

No. 912,787.　　　　　Specification of Letters Patent.　　　　Patented Feb. 16, 1909.

Application filed February 11, 1908. Serial No. 415,379.

*To all whom it may concern:*

Be it known that I, THOMAS M. BELKNAP, citizen of the United States, residing at Burlington, in the county of Des Moines and State of Iowa, have invented certain new and useful Improvements in Ice-Cream Freezers, of which the following is a specification.

The present invention relates to a novel means for freezing cream and the like, and aims to provide an improved construction of freezer in which the entire freezing mechanism is housed within a casing so as to be protected from the action of the exterior atmosphere.

The object of the invention is to design a freezer of this character which is simple in its construction and operation, there being no dasher employed and the ice or other freezing mixture being so located as to prevent the same from clogging or otherwise interfering with the free action of the machine.

For a full description of the invention and the merits thereof and also to acquire a knowledge of the details of construction and the means for effecting the result, reference is to be had to the following description and accompanying drawings, in which:

Figure 1 is a perspective view of an ice cream freezer embodying the invention. Fig. 2 is a vertical longitudinal sectional view through the same. Fig. 3 is a vertical transverse sectional view on the line 3—3 of Fig. 2. Fig. 4 is a similar view on the line 4—4 of Fig. 2.

Corresponding and like parts are referred to in the following description and indicated in all the views of the drawings by the same reference characters.

The freezing mechanism is mounted within a casing which may be of any approved construction, but is preferably rectangular as shown since such a casing can be cheaply manufactured and can also be easily shipped and stored.

Referring to the drawings the numeral 1 designates the body portion of the casing and 2 the cover therefor which is preferably hinged to the said body portion and may be held in a closed position by any suitable means such as the hook member 3. A tray 4 designed to receive the cream or other material to be frozen is located upon the bottom of the casing 1 at one end thereof, and the said tray is preferably mounted so as to have a rocking action. For this purpose a transverse rib 5 extends across the bottom of the tray, a notch 6 being formed at the middle portion of the rib and legs 7 being located at opposite ends thereof, the notched portion of the rib engaging a corresponding depression in a projection 8 upon the bottom of the casing 1 and coöperating therewith to hold the tray against lateral displacement. It will also be observed that the bottom of the tray 4 is inclined upwardly at one end thereof as indicated at 9, a feed roller 10 being journaled between the sides of the tray adjacent the upwardly inclined portion of the bottom thereof. This feed roller is removable from the tray so as to admit of the various members being thoroughly cleansed and is provided at its extremities with the studs 11 received within bearings 12 applied to the sides of the tray. The weight of this feed roller normally rocks the tray and causes the upwardly inclined end of the bottom thereof to rest upon the bottom of the casing, in which position the liquid contents of the tray drain toward the end of the tray provided with the said inclined bottom where they can be fed by the roller 10 and delivered to the rotary freezing member in a thin film as will be hereinafter more fully described.

For the purpose of holding the rocking tray in the required position a crank arm 13 is provided which engages the end of the tray opposite that at which the feed roller is mounted, said crank arm being controlled by an integral spring lever 14 located upon the exterior of the casing and adapted to engage a rack 15 upon the inner face of a keeper 16. It will thus be apparent that by pressing the spring lever inwardly it will be disengaged from the rack and can be moved up and down and the crank arm 13 caused to bear downwardly upon the end of the tray or elevated as the end of the tray which is weighted with the feed roller is depressed.

Mounted within the casing and over the tray 4 in coöperative relation to the feed roller 10 is a rotary freezing member 17 the surface of which is maintained at a freezing temperature and to which the cream or other material to be frozen is fed in a comparatively thin film. In the present instance this rotary freezing member is of cylindrical and hollow formation and is designed to contain any suitable freezing mixture such as ice and salt. The cylinder is provided at opposite ends with trunnions 18 received removably within notched bearings 19 in the upper edge of the body portion of the casing, one of the trunnions projecting upon the exterior of the casing where it has an angular formation and is designed to engage a detachable crank handle 20, while the opposite trunnion is carried by the cover 21 of the freezing member. This cover may be of any suitable construction, and in the present instance is formed with a pair of hooked lugs 22 which pass through notches in the mouth of the freezing cylinder and are designed when turned to engage cam surfaces and draw the cover tightly into position, a rubber gasket 23 being utilized to obtain an approximately air tight closure. It will also be observed that a longitudinal rib 24 is located within the interior of the freezing cylinder for the purpose of agitating the ice and salt and causing the same to operate in the most effective manner.

A scraper 25 is utilized for removing the frozen cream from the exterior surface of the freezing cylinder, and the said scraper is so mounted as to be either thrown into or out of operative position as may be required. Preferably, the scraper is rigid with a shaft 26 journaled between opposite sides of the casing, one end of the shaft terminating in a spring lever 27 located upon the exterior of the casing and engaging a rack 28 similar to that previously described in connection with the spring lever 14. It will thus be apparent that the scraper 25 can be moved entirely away from the freezing cylinder or caused to bear against the same with the required pressure, and can be locked in an adjusted position by permitting the spring lever to engage the rack 28.

More specifically describing the scraper it will be observed that the same is formed with end flanges 29 for guiding the frozen material removed from the freezing cylinder into a suitable receptacle such as indicated at 30, and is provided with a removable and reversible scraping blade 31 which comes into direct contact with the cylinder, the said blade being received within a longitudinal recess and extending along the edge of the scraper.

The receptacle 30 is suitably packed to retain in a frozen condition the material removed from the freezing cylinder and delivered into the same by means of the scraper, and in the present instance the receptacle is received within a larger vessel 32, the space between the two being filled with a freezing mixture.

In the operation of the freezer the cream or other material is placed in the tray 4 and the freezing material within the freezing cylinder 17. As this cylinder is rotated through the medium of the crank handle 20 the cream within the tray is fed in a thin film by means of the roller 10 to the exterior surface of the freezing cylinder. This material congeals upon the surface of the said cylinder and is removed therefrom and discharged into the collecting receptacle 30 by means of the scraper 25. For the purpose of enabling the operator to determine at any time whether or not the freezer is working in a satisfactory manner an opening 33 is formed in the cover of the casing, the said opening being closed by a piece of glass or other transparent material. If found desirable a funnel 34 may be applied to one end of the casing for the purpose of guiding cream or other material into the tray 4 such a construction enabling the member to be filled without the necessity of removing the freezing cylinder.

Having thus described the invention, what is claimed as new is:

1. In a device of the character described, the combination of a casing, a rocking tray within the casing, a transverse rib projecting downwardly from the bottom of the rocking tray and having an intermediate portion thereof notched while the end portions thereof are formed with legs adapted to rest upon the bottom of the casing, a projection upon the bottom of the casing for engaging the notched portion of the rib to form a fulcrum upon which the tray rocks and hold the tray against lateral displacement, means for tilting the tray, a feed roller mounted within the tray, a rotary freezing cylinder journaled within the casing in coöperative relation to the feed roller, and means for removing the frozen material from the surface of the freezing cylinder.

2. In a device of the character described, the combination of a casing, a rocking tray mounted within the casing, a feed roller journaled within one end of the rocking tray and normally holding the same in a depressed position, a crank arm engaging the upper edge of the tray at the opposite end thereof and serving to tilt the tray against the action of the feed roller, a rotary freezing cylinder mounted within the casing in coöperative relation to the feed roller, and means for removing the frozen material from the surface of the freezing cylinder.

In testimony whereof I affix my signature in presence of two witnesses.

THOMAS M. BELKNAP. [L. S.]

Witnesses:
H. F. KUHLEMEIER,
LE ROY B. DENNISTON.